United States Patent
Yu

(10) Patent No.: US 12,403,586 B1
(45) Date of Patent: Sep. 2, 2025

(54) CONNECTION STRUCTURE AND PARALLEL LINK ROBOT

(71) Applicant: FANUC CORPORATION, Yamanashi (JP)

(72) Inventor: Changmiao Yu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/857,637

(22) PCT Filed: May 12, 2022

(86) PCT No.: PCT/JP2022/020116
§ 371 (c)(1),
(2) Date: Oct. 17, 2024

(87) PCT Pub. No.: WO2023/218618
PCT Pub. Date: Nov. 16, 2023

(51) Int. Cl.
*B25J 9/00* (2006.01)
*B25J 9/16* (2006.01)
*B25J 17/02* (2006.01)

(52) U.S. Cl.
CPC ........... *B25J 9/0051* (2013.01); *B25J 9/1623* (2013.01); *B25J 17/0266* (2013.01)

(58) Field of Classification Search
CPC ...... B25J 9/0051; B25J 9/1065; B25J 9/1623; B25J 17/0266
See application file for complete search history.

(56) References Cited

U.S. PATENT DOCUMENTS 6,419,211 B1 * 7/2002 Hvittfeldt ............ B25J 17/0275
267/74
8,418,579 B2 * 4/2013 Zhang .................. B25J 17/0266
74/490.04
(Continued)

FOREIGN PATENT DOCUMENTS

JP    2004142791 A    5/2004
JP    2009097571 A    5/2009
(Continued)

OTHER PUBLICATIONS

International Search Report dated Jun. 28, 2022, for International Patent Application No. PCT/JP2022/020116.

*Primary Examiner* — Bobby Rushing, Jr.
(74) *Attorney, Agent, or Firm* — KARCESKI IP LAW, PLLC

(57) ABSTRACT

A connection structure includes bushings attached to two links so as to be rotatable about an axis perpendicular to a plane containing two longitudinal axes of the two links; a biasing mechanism spanning between the bushings of the two links and applying an elastic restoring force in a direction in which the two bushings move closer together; and a connection member having two attachment holes through which the bushings can pass in a direction of the axis and regulating a distance between the bushings to be less than or equal to a prescribed distance. The bushings include claw portions projecting radially outward. The attachment holes are formed in a shape allowing the bushings to pass therethrough at a prescribed attachment phase around the axis coinciding with the claw portions of the bushings. A phase of the bushings is regulated to a phase that does not match the attachment phase.

7 Claims, 13 Drawing Sheets

(56) References Cited

U.S. PATENT DOCUMENTS

| | | | | |
|---|---|---|---|---|
| 8,948,915 B2* | 2/2015 | Nakanishi | ............ | B25J 17/0283 |
| | | | | 700/258 |
| 8,973,459 B2* | 3/2015 | Fukudome | ............ | B25J 9/0051 |
| | | | | 901/27 |
| 9,346,172 B2* | 5/2016 | Mihara | ............ | B25J 9/003 |
| 9,737,985 B2* | 8/2017 | Wu | ............ | B25J 9/0051 |
| 2010/0037721 A1* | 2/2010 | Nakao | ............ | B25J 9/0051 |
| | | | | 901/28 |
| 2018/0257229 A1* | 9/2018 | Wakita | ............ | B25J 9/0051 |

FOREIGN PATENT DOCUMENTS

| | | | |
|---|---|---|---|
| JP | 2011194534 A | 10/2011 | |
| JP | 2013158878 A | 8/2013 | |
| JP | 2014073541 A | 4/2014 | |

* cited by examiner

CONNECTION STRUCTURE AND PARALLEL LINK ROBOT

CROSS-REFERENCE TO RELATED APPLICATION(S)

This is a National Stage Entry into the United States Patent and Trademark Office from International Patent Application No. PCT/JP2022/020116, filed on May 12, 2022, the entire contents of which are incorporated herein by reference.

FIELD OF THE INVENTION

The present disclosure relates to a connection structure and a parallel link robot.

BACKGROUND ART

A spring device that connects two parallel links of a robot employing a parallel mechanism is known (for example, refer to Japanese Unexamined Patent Application Publication No. 2009-097571). This spring device restricts the distance between the two links from increasing to or beyond a prescribed distance while pulling the links closer together in the direction in which the links move closer together.

SUMMARY OF INVENTION

An aspect of the present disclosure provides a connection structure that interconnects two links. The two links have longitudinal axes and are spaced apart from each other in parallel and operated. The connection structure includes: bushings attached to the links so as to be rotatable about an axis perpendicular to a plane containing the two longitudinal axes; a biasing mechanism spanning between the bushings of the two links and applying an elastic restoring force to the two bushings in a direction in which the two bushings move closer together; and a connection member having two attachment holes through which the bushings can pass in a direction of the axis and regulating a distance between the bushings to be less than or equal to a prescribed distance. The bushings include claw portions projecting radially outward at part of, in a peripheral direction, an end portion of each of the bushings in the direction of the axis. The attachment holes are formed in a shape allowing the bushings to pass therethrough only at a prescribed attachment phase around the axis coinciding with the claw portions of the bushings. A phase of the bushings around the axis is regulated by the elastic restoring force to a phase that does not match the attachment phase.

DESCRIPTION OF EMBODIMENT(S) OF THE INVENTION

Figure 1:
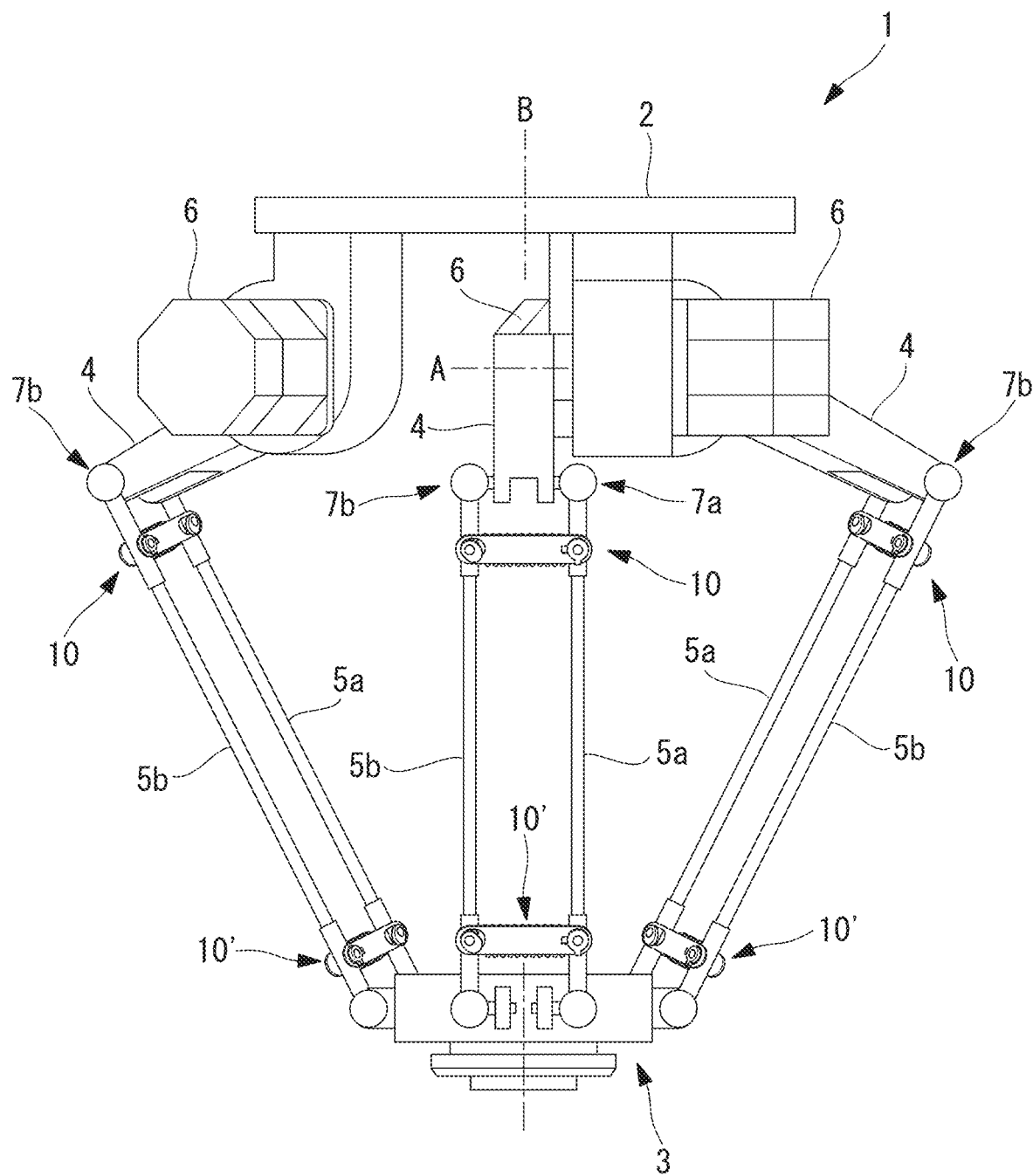
FIG. 1 is front view schematically illustrating a parallel link robot according to an embodiment of the present disclosure.

A connection structure 10 and a parallel link robot 1 according to an embodiment of the present disclosure will be described below while referring to the drawings.

The parallel link robot 1 according to this embodiment includes, for example, a base 2 that is suspended from and is fixed to a ceiling or the like, as illustrated in FIG. 1. The parallel link robot 1 further includes a movable part 3 disposed below and spaced apart from the base 2. Furthermore, the parallel link robot 1 includes three arms 4. The arms 4 are supported so as to be rotatable around three respective horizontal axes A with respect to the base 2. The parallel link robot 1 further includes a pair of mutually parallel links 5a, 5b for each arm 4. Each pair of parallel links 5a, 5b connects the corresponding arm 4 to the movable part 3. The parallel link robot 1 further includes connection structures 10, 10' spanning between each pair of links 5a, 5b.

The base 2 includes three servomotors 6 for respectively driving the three arms 4. The servomotors 6 are disposed at equal intervals along a peripheral direction around an axis B that passes through the center of the base 2 and extends in the vertical direction.

The servomotors 6 each include a rotary drive shaft (not illustrated) that is made to rotate around the horizontal axis A.

Figure 2:
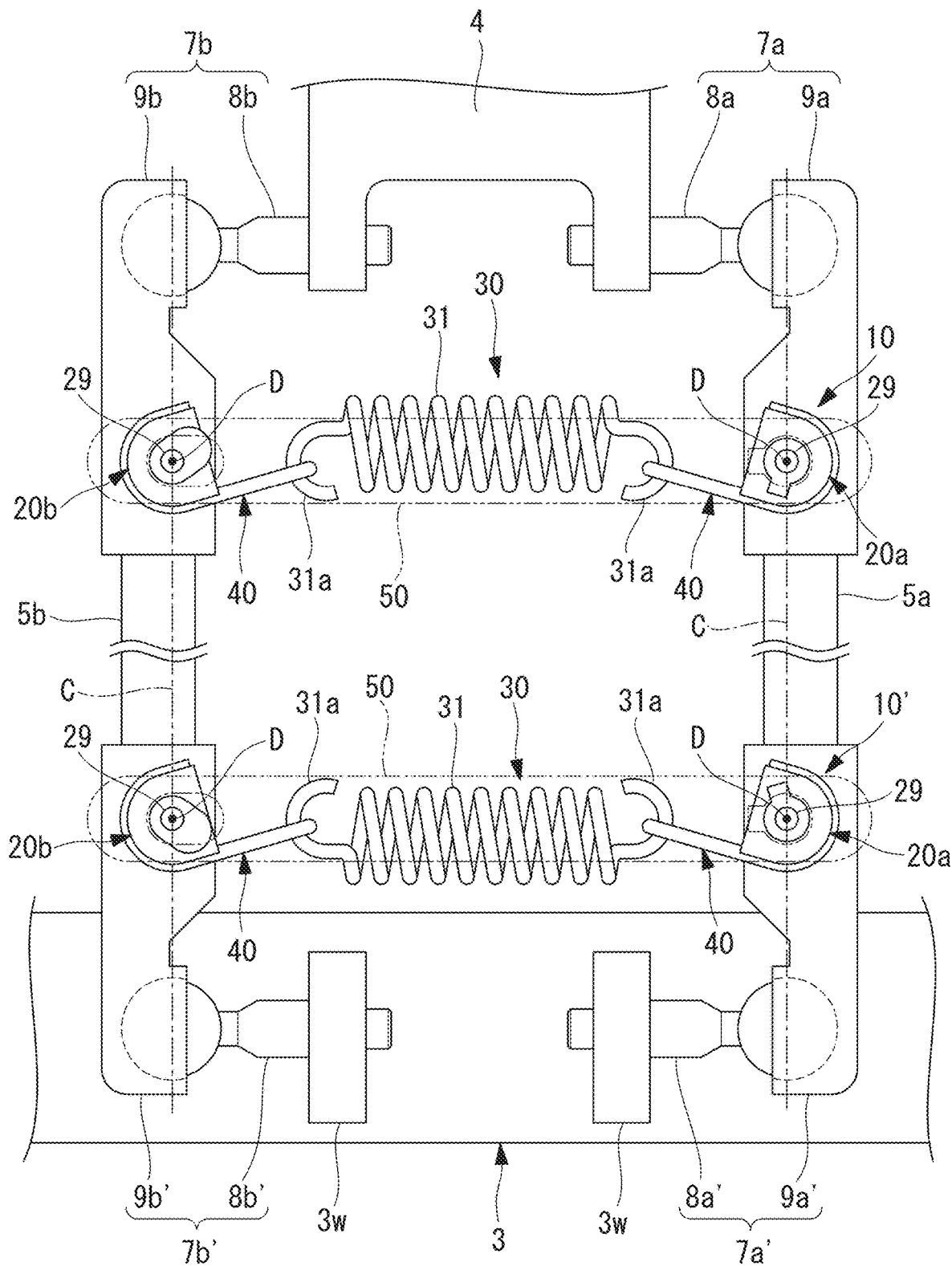
FIG. 2 is a front view schematically illustrating an attachment state of a biasing mechanism of a connection structure in a pair of links of the parallel link robot in FIG. 1.

Each arm 4 is connected at its base end to the rotary drive shaft of the corresponding servomotor 6 and can rotate around the axis A relative to the base 2. As illustrated in FIG. 2, the parallel link robot 1 further includes pairs of ball joints 7a, 7b. Each pair of ball joints 7a, 7b connects the leading end of the corresponding arm 4 to the corresponding links 5a, 5b. The ball joints 7a, 7b include ball studs 8a, 8b and sockets 9a, 9b.

The ball studs 8a, 8b are externally attached to both sides of the leading end of each arm 4 in the direction of the axis A (see FIG. 1) with the leading end of the arm 4 interposed therebetween.

Each pair of links 5a, 5b includes the sockets 9a, 9b at one end thereof in the direction of the respective longitudinal axis C. The sockets 9a, 9b are respectively fitted to the ball studs 8a, 8b at the leading end of corresponding arm 4 as through being sandwiched from both sides in the direction of the axis A.

Figure 3:
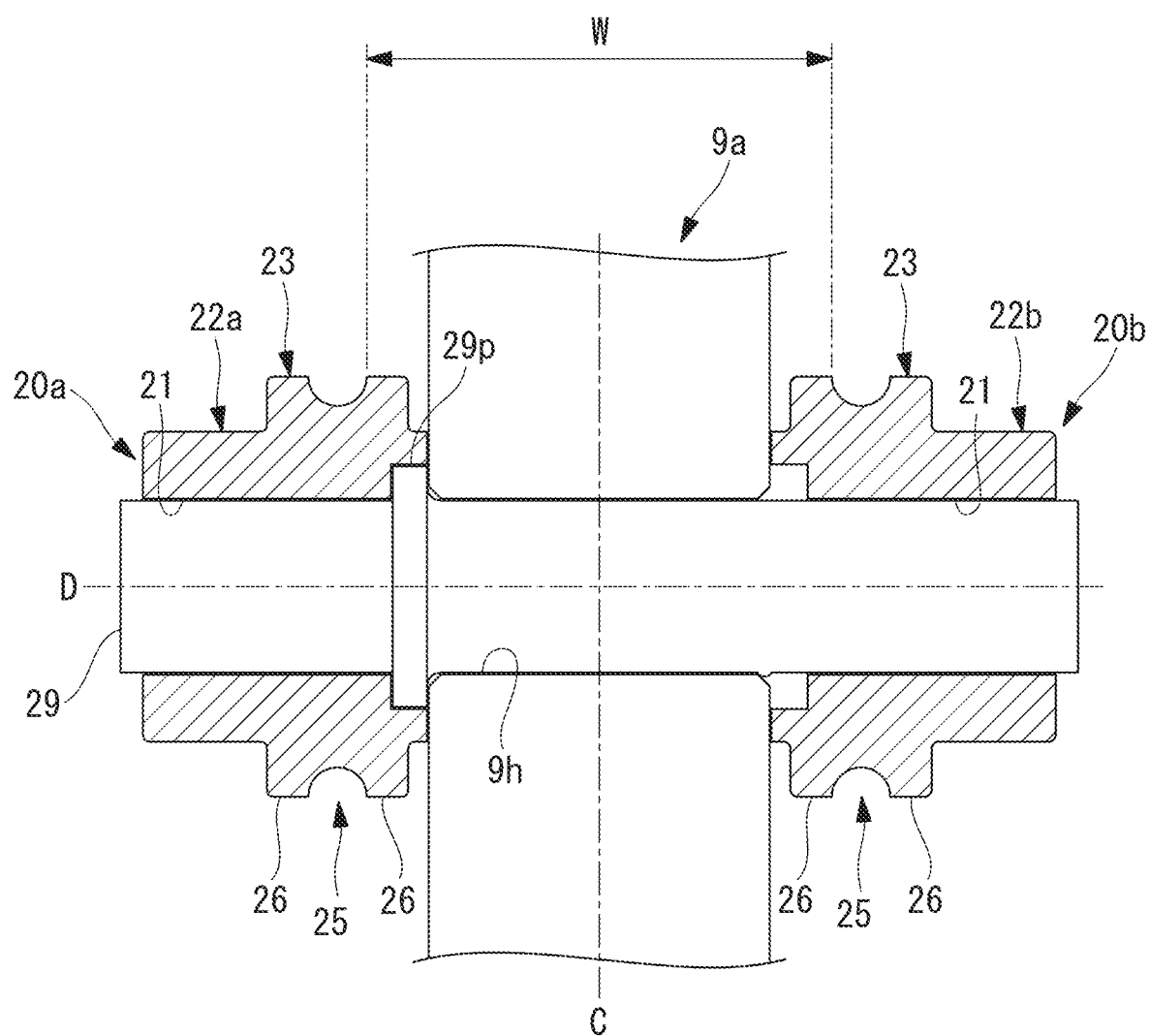
FIG. 3 is a sectional view illustrating the shapes of an attachment pin and a pair of bushings of one link of the parallel link robot in FIG. 1.
Figure 4:
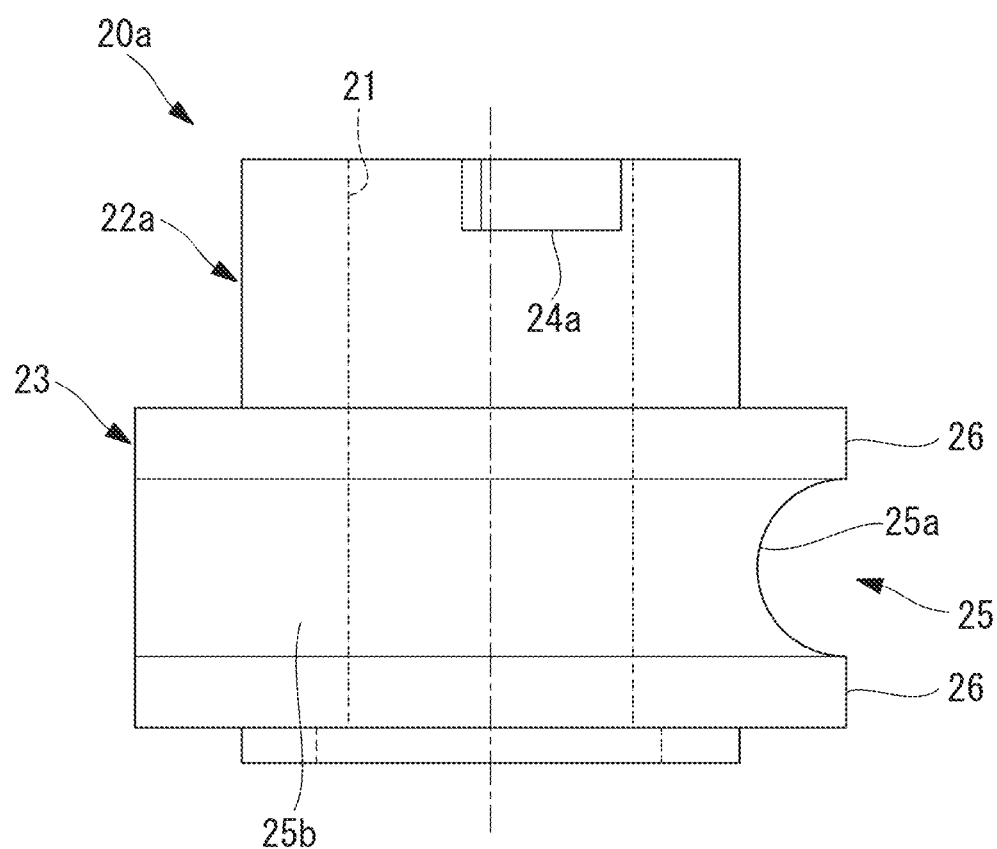
FIG. 4 is a side view illustrating the shape of one bushing of the connection structure illustrated in FIG. 3.
Figure 5:
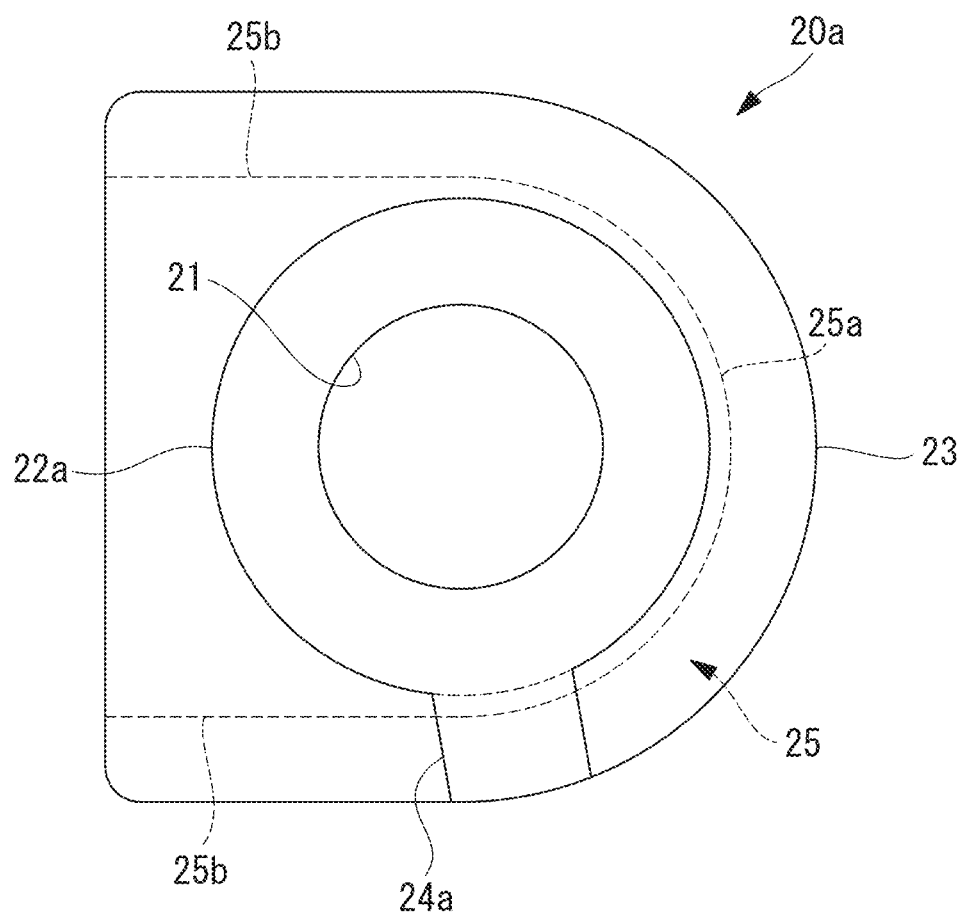
FIG. 5 is a front view illustrating the shape of the bushing illustrated in FIG. 4.
Figure 6:
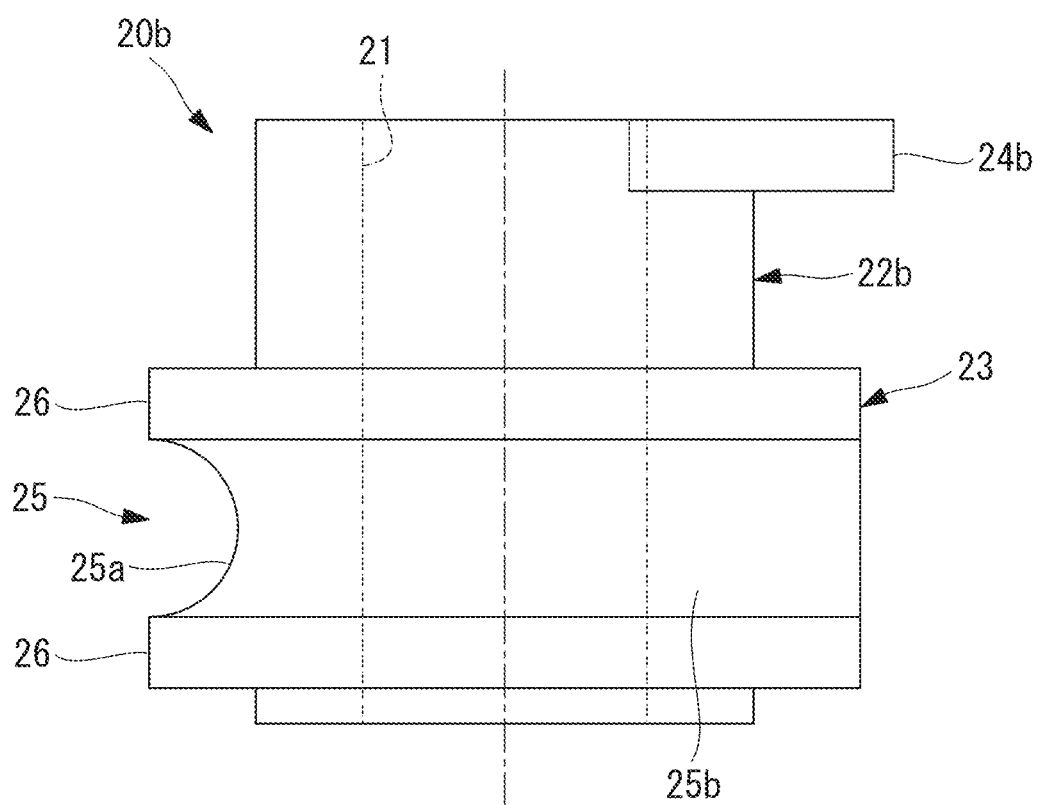
FIG. 6 is a side view illustrating the shape of the other bushing of the connection structure illustrated in FIG. 3.
Figure 7:
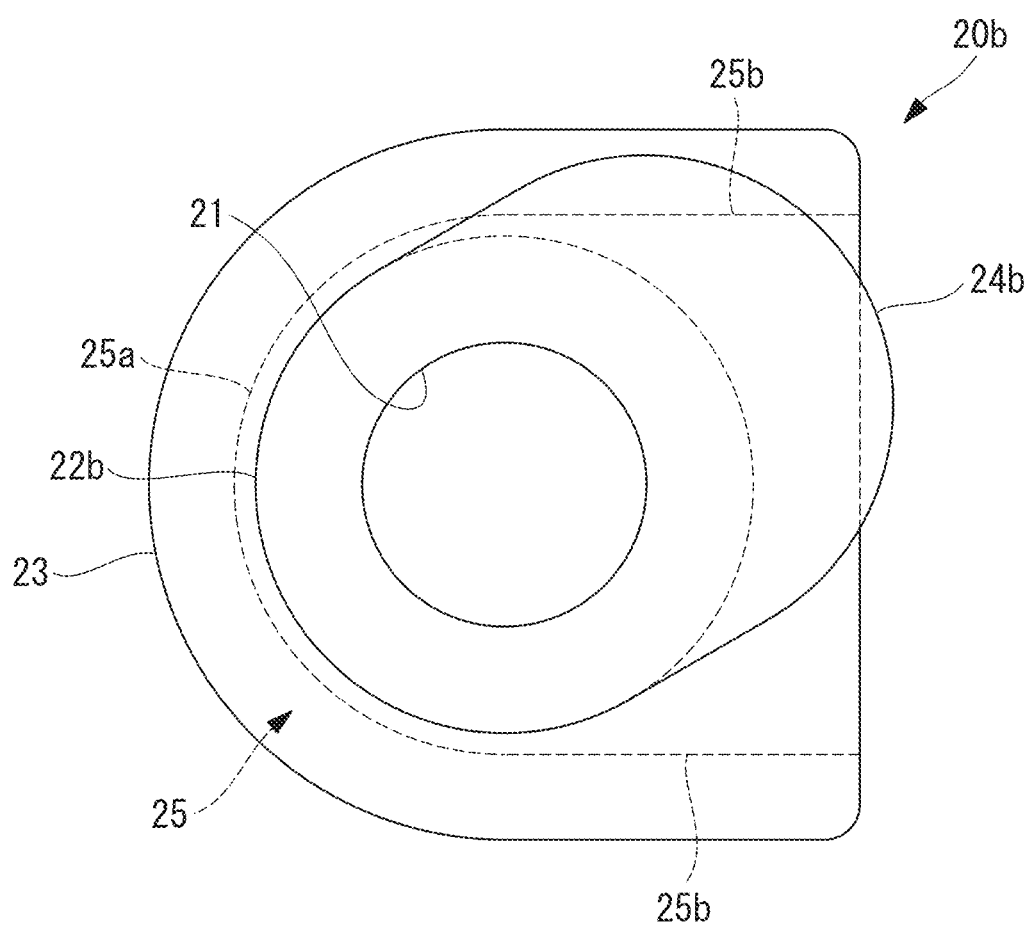
FIG. 7 is a front view illustrating the shape of the bushing illustrated in FIG. 6.

Each socket 9a, 9b includes an attachment pin 29 protruding in a direction perpendicular to the longitudinal axis C, as illustrated in FIGS. 2 and 3. Each attachment pin 29 is press-fitted into a pin hole 9h that extends through the socket 9a, 9b in a direction perpendicular to the longitudinal axis C, and protrudes on both sides of the longitudinal axis C. The attachment pin 29 is press-fitted into the pin hole 9h from one side until a flange-shaped positioning portion 29p provided at a midway position along the length direction is abutted. In this way, the amounts by which the attachment pin 29 protrudes on both sides of the outer peripheral surface of the socket 9a, 9b are adjusted to be the same length as each other. In the assembled state, the attachment pin 29 extends along an axis D perpendicular to the plane containing the longitudinal axes C of the two links 5a, 5b.

Each link 5a, 5b includes a socket 9a', 9b', which is similar to that at the one end, at the other end thereof in the direction of the longitudinal axis C. The sockets 9a', 9b' together with ball studs 8a', 8b' provided on the movable part 3 constitute ball joints 7a', 7b'. Similarly to the sockets 9a, 9b, the sockets 9a', 9b' each include the pin hole 9h and the attachment pin 29 press-fitted into the pin hole 9h.

The movable part 3 includes a pair of parallel flat-plate-like attachment portions 3w protruding radially outward from the outer peripheral surface of the movable part 3 at positions corresponding to each pair of links 5a, 5b. The ball studs 8a', 8b' are attached to the outside of each pair of attachment portions 3w. The sockets 9a', 9b' at the other end of the links 5a, 5b are respectively fitted to the ball studs 8a', 8b' as though being sandwiched from both sides in the direction of the axis A.

Next, the connection structures 10, 10' according to this embodiment will be described.

In this embodiment, the three pairs of links 5a, 5b and the three upper and lower connection structures 10, 10' each have substantially the same configuration. Therefore, the configurations of one pair of links 5a, 5b and one connection structure 10 will be described below as an example.

The connection structure 10 includes bushings 20a, 20b attached to the sockets 9a, 9b, as illustrated in FIGS. 2 and 3, for example. The connection structure 10 includes a biasing mechanism 30 and connection members 50, which span between the sockets 9a, 9b and connect the sockets 9a, 9b to each other, as illustrated in FIG. 2.

The bushings 20a, 20b are, for example, manufactured by injection molding a resin material such as silicone resin. The bushings 20a, 20b each have a cylindrical form including a hollow hole 21, as illustrated in FIGS. 4 to 7.

The hollow hole 21 has a circular cross section that allows the attachment pin 29 to be rotatably fitted thereinto. The hollow hole 21 in the bushing 20a is provided with a relief portion corresponding to the positioning portion 29p provided on the attachment pin 29. Thus, the combination of bushings 20a, 20b to be attached to the two ends of the attachment pin 29 is uniquely determined.

The bushings 20a, 20b respectively include first cylindrical portions 22a, 22b on one side in the axial direction and second cylindrical portions 23 on the other side in the axial direction. The first cylindrical portions 22a, 22b respectively include, at the leading ends of the cylindrical parts in the axial direction, claws (claw portions) 24a, 24b formed so as to protrude radially outward along part of the peripheral direction.

The claws 24a, 24b will be described later.

The second cylindrical portions 23 have larger outer shapes than an outer diameter dimensions of the first cylindrical portions 22a, 22b. Each second cylindrical portion 23 includes a groove 25 that is radially recessed at a position midway along the respective axial direction. Thus, the second cylindrical portion 23 includes flanges 26 that extend radially outward from the groove 25 on both sides of the groove 25 in the respective axial direction.

The groove 25 includes a semi-circular arc-shaped curved groove 25a and a pair of straight grooves 25b, which are parallel to each other and are continuous with the two ends of the curved groove 25a. As a result, the groove 25 and the flanges 26 have a non-circular cross-sectional shape.

The biasing mechanism 30 includes a coil spring (elastic body) 31 and two hooks 40 disposed at the two ends of the coil spring 31, as illustrated in FIG. 2. The hooks 40 are connected to the two ends of the coil spring 31 by hooking onto hook portions 31a at the two ends of the coil spring 31.

The hook portions 31a each have a shape obtained by bending the wire constituting the coil spring 31 into a hook shape. The coil spring 31 has a spring constant of sufficient size to apply a preload of an appropriate magnitude to the ball joints 7a, 7b.

Figure 8:
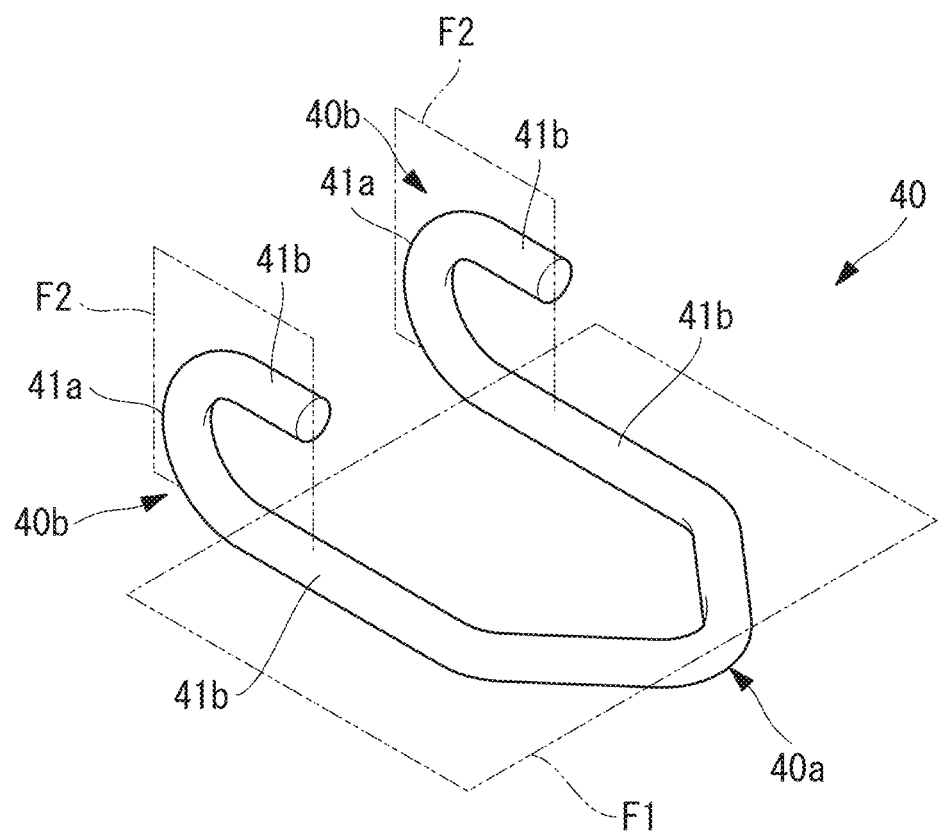
FIG. 8 is a perspective view illustrating the shape of a hook of the connection structure illustrated in FIG. 2.

Each hook 40 is a member obtained by bending and shaping a round metal bar, as illustrated in FIG. 8. The round metal bar has an outer diameter dimension equivalent to the groove width of the grooves 25 of the bushings 20a, 20b.

Each hook 40 includes a first connection portion 40a formed by bending the hook 40 at the center in the length direction along any first plane F1. The hook 40 further includes a pair of second connection portions 40b formed by bending both ends of the hook 40 in the length direction along a second plane F2 perpendicular to the first plane F1. Each second connection portion 40b includes a pair of straight portions 41b located at the two ends of a semicircular arc-shaped curved portion 41a and extending parallel to each other.

The spacing between the pair of second connection portions 40b is equivalent to a distance W between the grooves 25 of the two bushings 20a, 20b attached to the socket 9a (see FIG. 3).

Each of the second connection portions 40b has a form that matches the shape of the corresponding groove 25 around the axis D.

The pair of second connection portions 40b are respectively hooked onto the grooves 25 of the two bushings 20a, 20b attached to the socket 9a. The curved portion 41a and the two straight portions 41b of each second connection portion 40b then closely contact the bottom of the corresponding groove 25. In other words, the curved portions 41a of each hook 40 closely contact the corresponding curved grooves 25a and the straight portions 41b of the hook 40 closely contact the corresponding straight grooves 25b. In this way, the two bushings 20a, 20b and the corresponding hook 40 are connected in an integrated manner so as to not rotate relative to each other around the axis D of the attachment pin 29.

The hook portions 31a of the coil spring 31 are hooked onto the first connection portions 40a of the hooks 40 with the second connection portions 40b hooked onto the bushings 20a, 20b. When the second connection portions 40b are hooked onto the grooves of the bushings 20a, 20b, the first connection portions 40a of the hooks 40 extend parallel to the axes D of the attachment pins 29. Therefore, the hook portions 31a at both ends of the coil spring 31 are hooked onto the two hooks 40 so as to be rotatable about axes parallel to the axes D.

Figure 9:
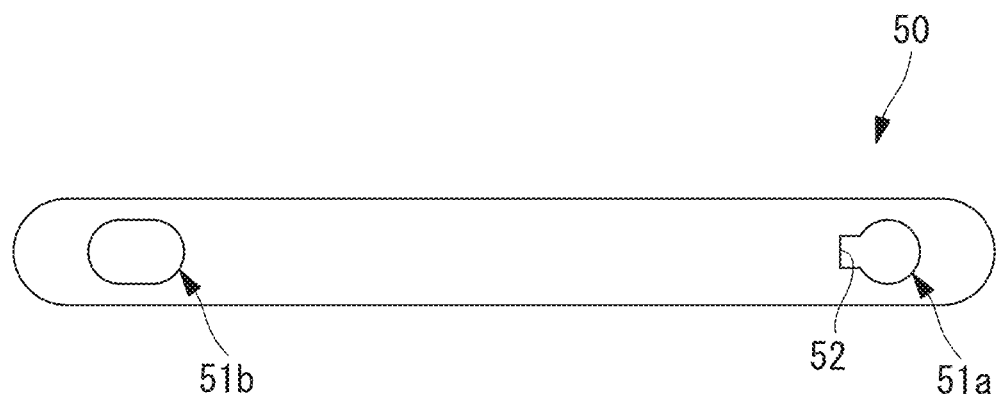
FIG. 9 is a front view illustrating the shape of a connection member of the connection structure illustrated in FIG. 2.

As illustrated in FIG. 9, each connection member 50 is a long strip-shaped member formed by punching a flat metal plate. The connection members 50 are disposed so that one connection member 50 is disposed on each side of the sockets 9a, 9b in the direction of the axis D. Each connection member 50 includes attachment holes 51a, 51b that penetrate therethrough in the plate thickness direction in the vicinity of both ends of the connection member 50 in the length direction.

The attachment hole 51a has an opening shape that allows the first cylindrical portion 22a, including the claw 24a of the bushing 20a, to pass therethrough in the axial direction of the first cylindrical portion 22a.

The claw 24a has a width dimension that is smaller than the diameter of the cylindrical part of the first cylindrical portion 22a and a length dimension that projects radially up to a position equivalent to the outer shape of the flange 26. The claw 24a is shaped like a flat plate having a prescribed thickness. The claw 24a extends from the outer surface of the cylindrical part of the first cylindrical portion 22a in a direction different from the length direction of the straight groove 25b, for example, in a direction at an angle of 120°.

The attachment hole 51a includes a cutout 52, along part of the circumferential direction of the circular opening shape having an inner diameter dimension slightly larger than the outer diameter dimension of the cylindrical part of the first cylindrical portion 22a. The size and shape of the cutout 52 are similar to the shape of and slightly larger than the claw 24a so as to allow the claw 24a to pass therethrough.

The attachment hole 51b has a long hole-shaped opening shape that allows the first cylindrical portion 22b, including the claw 24b of the bushing 20b, to pass therethrough in the axial direction of the first cylindrical portion 22b. The claw 24b has a width dimension that is equivalent to the diameter of the cylindrical part of the first cylindrical portion 22a and a length dimension that projects radially further than the outer diameter of the flange 26. The claw 24b is shaped like a flat plate having a prescribed thickness. The claw 24b extends from the outer surface of the cylindrical part of the first cylindrical portion 22b in a direction different from the length direction of the straight groove 25b, for example, in a direction at an angle of 30°.

The attachment hole 51b has a width dimension slightly larger than the width dimension of the claw 24b and a length dimension slightly larger than the dimension of the first cylindrical portion 22b in the length direction of the claw 24b. The attachment hole 51b extends in the longitudinal axial direction of the connection member 50 and allows the cylindrical part of the first cylindrical portion 22b to pass therethrough so as to be movable in the longitudinal axial direction of the connection member 50.

The connection member 50 allows the first cylindrical portions 22a, 22b disposed on the same side of the sockets 9a, 9b in the direction of the axis D to pass through the attachment holes 51a, 51b, respectively.

In this case, the phases around the D axis of the length direction of the claws 24a, 24b, which pass through the attachment holes 51a, 51b, and the length direction of the cutout 52 are different from each other.

Operation of the thus-configured parallel link robot 1 and connection structure 10 will be described hereafter. In the following description, one of the two connection members 50 will be described as an example, and the description of the other connection member 50 will be omitted.

The parallel link robot 1 according to this embodiment is assembled as follows.

In the assembly, a base unit, the movable part 3, three pairs of links 5a, 5b, and three of each of the connection structures 10, 10' are prepared. The base unit is obtained by assembling three arms 4 and the ball studs 8a, 8b from the base 2. Each link 5a, 5b has the socket 9a, 9b and the attachment pin 29 attached at one end and the socket 9a', 9b' and the attachment pin 29 attached at the other end.

In order to assemble the parallel link robot 1, first, the two hooks 40 are respectively connected to the coil springs 31 of the connection structures 10, 10'. Specifically, the hook portions 31a on both sides of each coil spring 31 are hooked onto the first connection portions 40a of the two hooks 40, respectively.

Next, a pair of bushings 20a, 20b are attached to the attachment pins 29 of the sockets 9a, 9b of the links 5a, 5b. The bushings 20a, 20b are brought closer together from both sides of the sockets 9a, 9b, and the attachment pins 29 are fitted into the hollow holes 21. Thus, the pair of bushings 20a, 20b are attached so as to be rotatable around the axis D of the same attachment pin 29.

Similarly, a pair of bushings 20a, 20b are attached to the attachment pin 29 of each socket 9a', 9b' of each link 5a, 5b. The bushings 20a, 20b are respectively attached to both ends of the attachment pin 29 of each socket 9a', 9b' so as to be rotatable around the axis D of the attachment pin 29.

Next, the pair of second connection portions 40b of the hook 40 on one side of the connection structure 10 are hooked onto the grooves 25 of the bushings 20a, 20b attached to the socket 9a. The pair of second connection portions 40b of the hook 40 on the other side are hooked onto the grooves 25 of the bushings 20a, 20b attached to the socket 9b.

Similarly, the hook 40 on one side of the connection structure 10' is hooked onto the grooves 25 of the bushings 20a, 20b attached to the socket 9a'. The hook 40 on the other side is hooked onto the grooves 25 of the bushings 20a, 20b attached to the socket 9b'.

Next, the sockets 9a, 9a' of one of the pair of links 5a, 5b, for example, the link 5a are respectively brought closer to the ball studs 8a, 8a'. The sockets 9a, 9a' are then fitted into the ball studs 8a, 8a' from the outside in the direction of the axis A. Then, while holding the link 5b on the other side, the two coil springs 31 are pulled in the direction of extension in order to increase the distance between the links 5a, 5b. Then, the sockets 9b, 9b' of the link 5b are simultaneously fitted into the ball studs 8b, 8b', respectively, from the outside in the direction of the axis A. As a result, the ball studs 8a, 8b are sandwiched in the direction of the axis A between the pair of sockets 9a, 9b. Similarly, the ball studs 8a', 8b' are sandwiched in the direction of the axis A between the pair of sockets 9a', 9b'.

In this way, the pair of links 5a, 5b are connected to each other by the two biasing mechanisms 30 and attached to the arm 4 and the movable part 3.

In this state, the two second connection portions 40b of one hook 40 are hooked onto the grooves 25 of the two bushings 20a, 20b with the socket 9a, 9b interposed therebetween. Thus, the hook 40 is integrally connected to the pair of bushings 20a, 20b.

The flanges 26 next to both sides of each groove 25 are positioned so that the corresponding second connection portion 40b of the hook 40 is interposed therebetween in the axial direction of the second cylindrical portions 23. In this way, the bushings 20a, 20b restrict the movement of the hook 40 along the axial direction of the attachment pin 29.

The hook 40 also restricts the bushings 20a, 20b from falling off the attachment pin 29. In other words, the bushings 20a, 20b and the hook 40 are rotatable in an integrated manner around the axis D of the attachment pin 29 and do not move relative to each other in any other direction. This similarly applies to the two bushings 20a, 20b with the socket 9a', 9b' interposed therebetween.

Next, the connection member 50 is attached between the links 5a, 5b.

Figure 10:
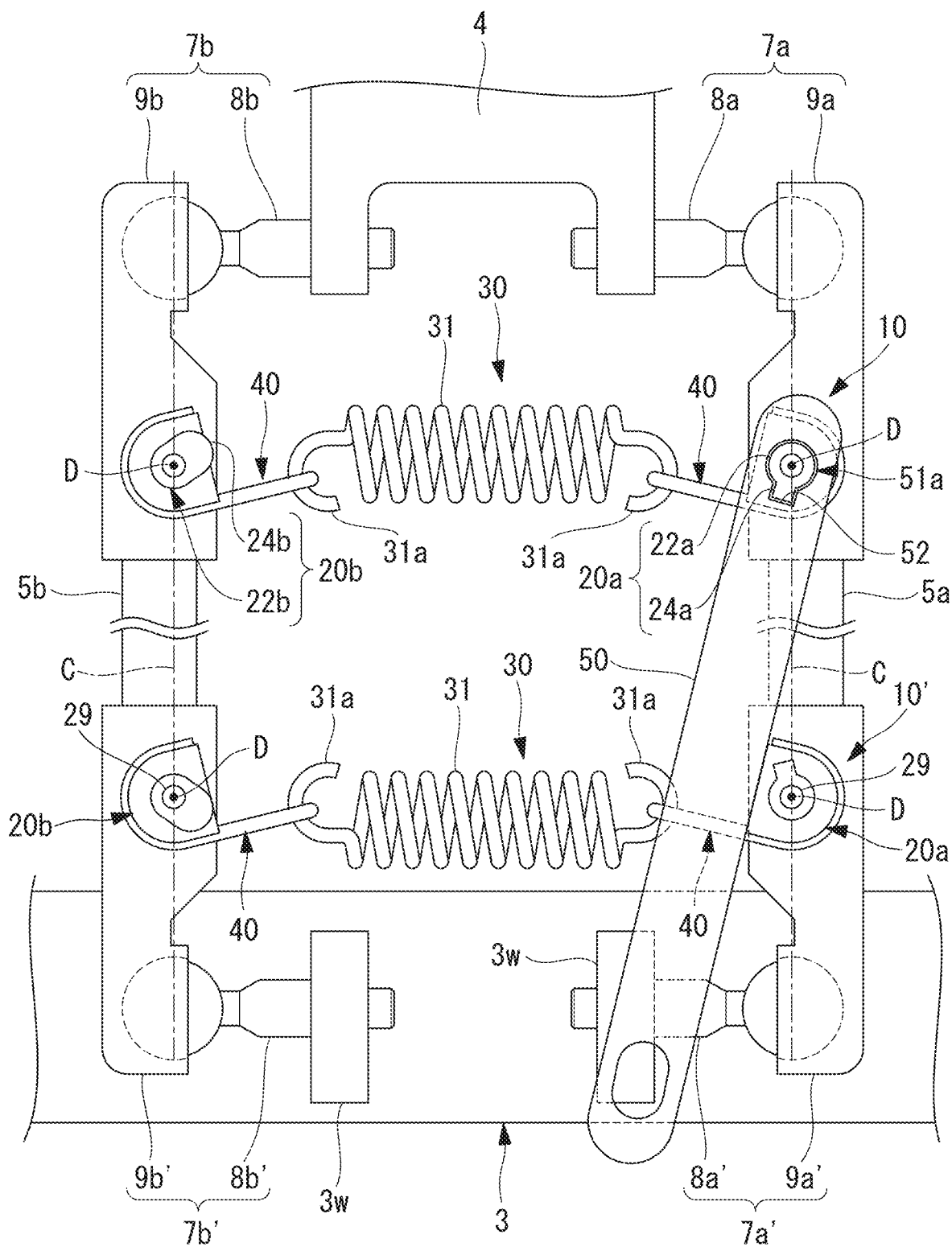
FIG. 10 is a diagram for explaining the procedure of attaching the connection member in the connection structure illustrated in FIG. 2.

As illustrated in FIG. 10, the first cylindrical portion 22a of the bushing 20a attached to one link 5a is passed through the attachment hole 51a of the connection member 50. By aligning the length direction of the cutout 52 of the attachment hole 51a with the phase of the claw 24a of the first cylindrical portion 22a, the first cylindrical portion 22a is easily passed through the attachment hole 51a. Once the claw 24a has passed through the attachment hole 51a, the connection member 50 is rotated around the axis D of the bushing 20a. In this way, the phases of the attachment hole 51a and the claw 24a are shifted from each other, and therefore the connection member 50 is attached to the first cylindrical portion 22a of the bushing 20a so as to not come off.

Next, the connection member 50 is rotated around the axis D of the bushing 20a up to the position where the attachment hole 51b is aligned with the first cylindrical portion 22b of the bushing 20b. In this state, the phase of the claw 24b of the bushing 20b is not aligned with the length direction of the attachment hole 51b of the connection member 50.

Figure 11:
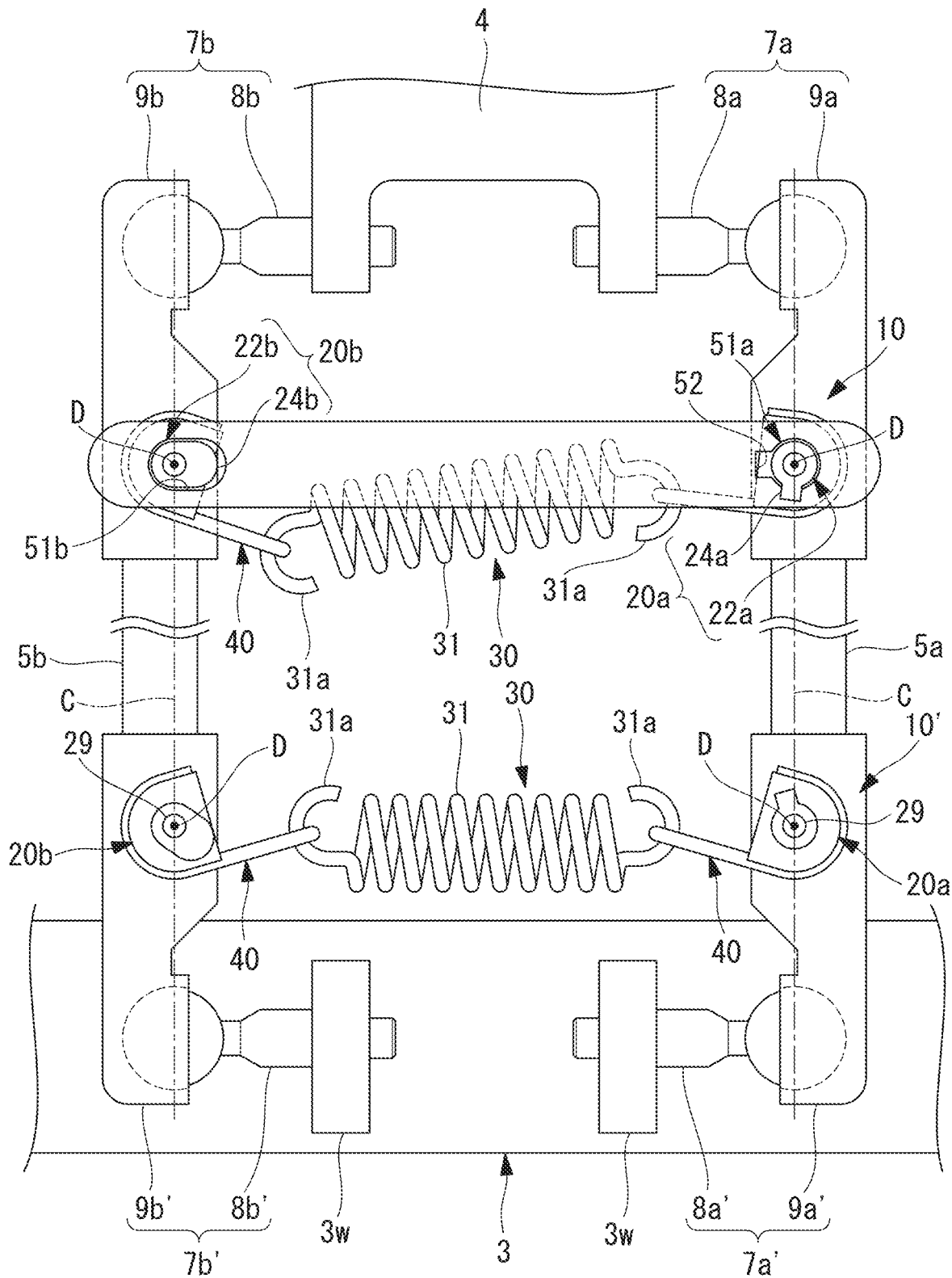
FIG. 11 is a diagram for explaining the procedure of attaching the connection member in the connection structure illustrated in FIG. 2.

Then, as illustrated in FIG. 11, force is applied to the connection part between the hook portion 31a of the coil spring 31 and the first connection portion 40a of the hook 40. This causes the coil spring 31 and the hook 40 to rotate relative to each other, the coil spring 31 stretches slightly, and the hook 40 and the bushing 20b rotate about the axis D.

Figure 12:
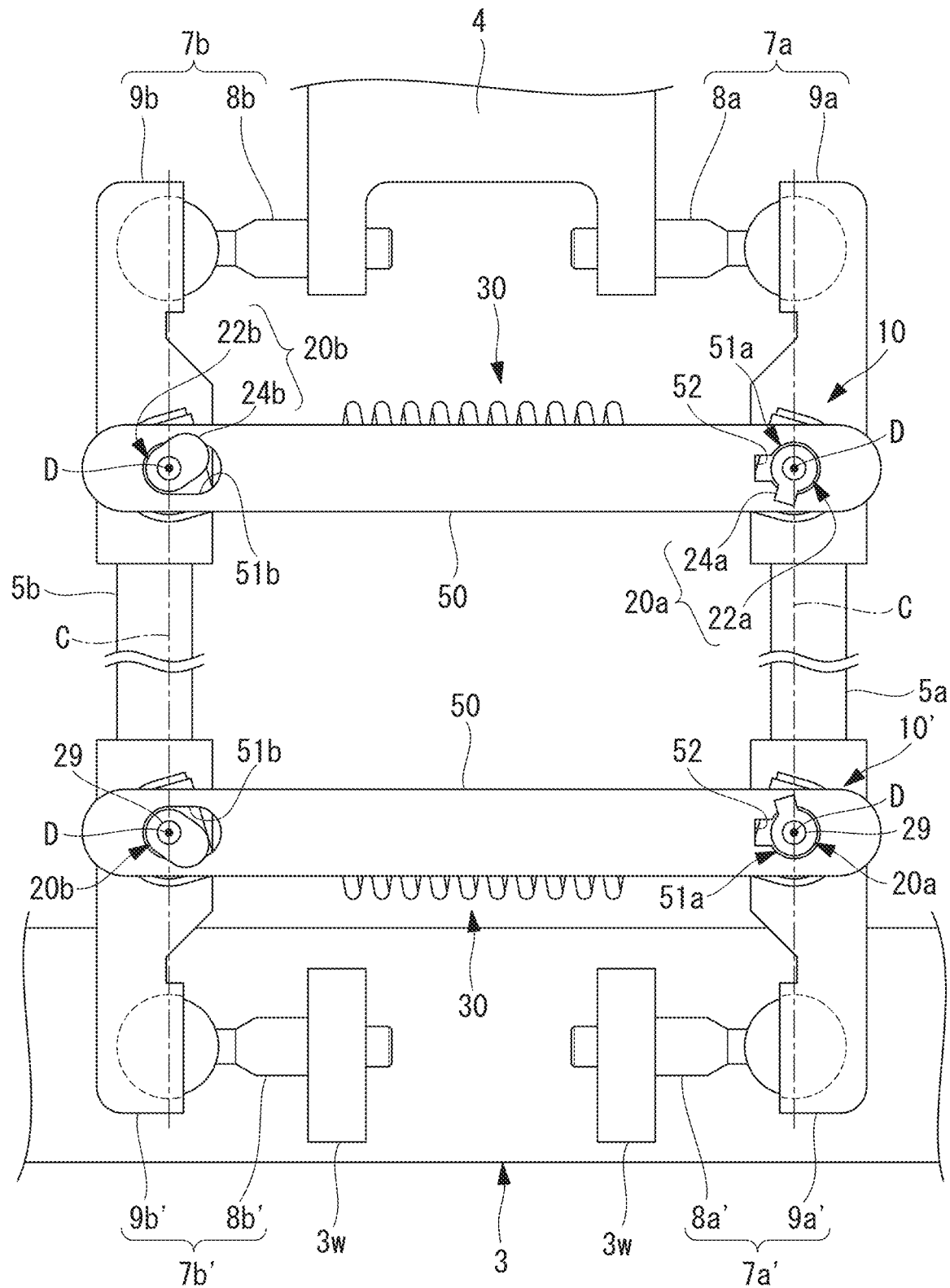
FIG. 12 is a front view schematically illustrating an attachment state of the connection member in the connection structure illustrated in FIG. 2.

At the time point when the bushing 20b has been rotated until the phase of the claw 24b is aligned with the length direction of the attachment hole 51b, the first cylindrical portion 22b is passed through the attachment hole 51b. At the time point when the claw 24b has passed through the attachment hole 51b, the force applied to the coil spring 31 is released. Thus, as illustrated in FIG. 12, the phases of the claw 24b and the attachment hole 51b are shifted from each other, and the connection member 50 is attached to the first cylindrical portion 22b so as to not come off.

Similarly, the connection member 50 of the connection structure 10' is suspended between the bushings 20a, 20b attached to the attachment pins 29 of the sockets 9a', 9b'. In the example illustrated in FIG. 10, the claw 24b of the bushing 20b of the connection structure 10' extends in a different direction from the claw 24b of the connection structure 10. This ensures that the coil spring 31 does not interfere with surrounding members when inserting the bushing 20b through the attachment hole 51b of the connection member 50 of the connection structure 10'.

The remaining two pairs of links 5a, 5b can be assembled in substantially the same manner, and in this way, the assembly of the parallel link robot 1 is completed.

Thus, according to this embodiment, a force is applied in the direction in which the spacing between the pair of links 5a, 5b becomes smaller and it is possible to restrict the links 5a, 5b from becoming separated beyond a prescribed amount. There is advantage in that the connection member 50, which regulates widening of the spacing, can be assembled or removed without the use of tools or jigs.

In addition, the bushings 20a, 20b, which support the connection member 50 with respect to the pair of links 5a, 5b, are held in prescribed postures by the biasing mechanism 30. In other words, the claws 24a, 24b and the attachment holes 51a, 51b of the connection member 50 are positioned with phases so as to prevent the connection member 50 from falling off. This prevents the connection member 50 from unintentionally falling off such as during the operation of the links 5a, 5b.

One attachment hole 51a of the connection member 50 has a circular cross section, and the first cylindrical portion 22a that passes through the attachment hole 51a does not undergo any relative movement in the radial direction inside the attachment hole 51a. Therefore, the parallel link robot 1 can operate without causing rattling between the connection member 50 and the bushing 20a.

Since one attachment hole 51b of the connection member 50 is a long hole, the first cylindrical portion 22b is allowed to undergo some displacement while remaining passing through the attachment hole 51b. This has the advantage that even if the distance between the links 5a, 5b decreases due to aging of the ball joints 7a, 7b, the decrease can be tolerated.

In this embodiment, the two hooks 40 are rotatably connected to the hook portions 31a at both ends of the coil spring 31 around an axis parallel to the axis D. Alternatively, at least one of the hooks 40 may be integrally fixed to the corresponding hook portion 31a.

For example, the hook 40 on the bushing 20a side may be secured to the hook portion 31a using welding or the like. If the hook 40 on the bushing 20b side and the coil spring 31 can rotate relative to each other, the phase of the claw 24b can be easily made to match the phase of the attachment hole 51b.

Figure 13:
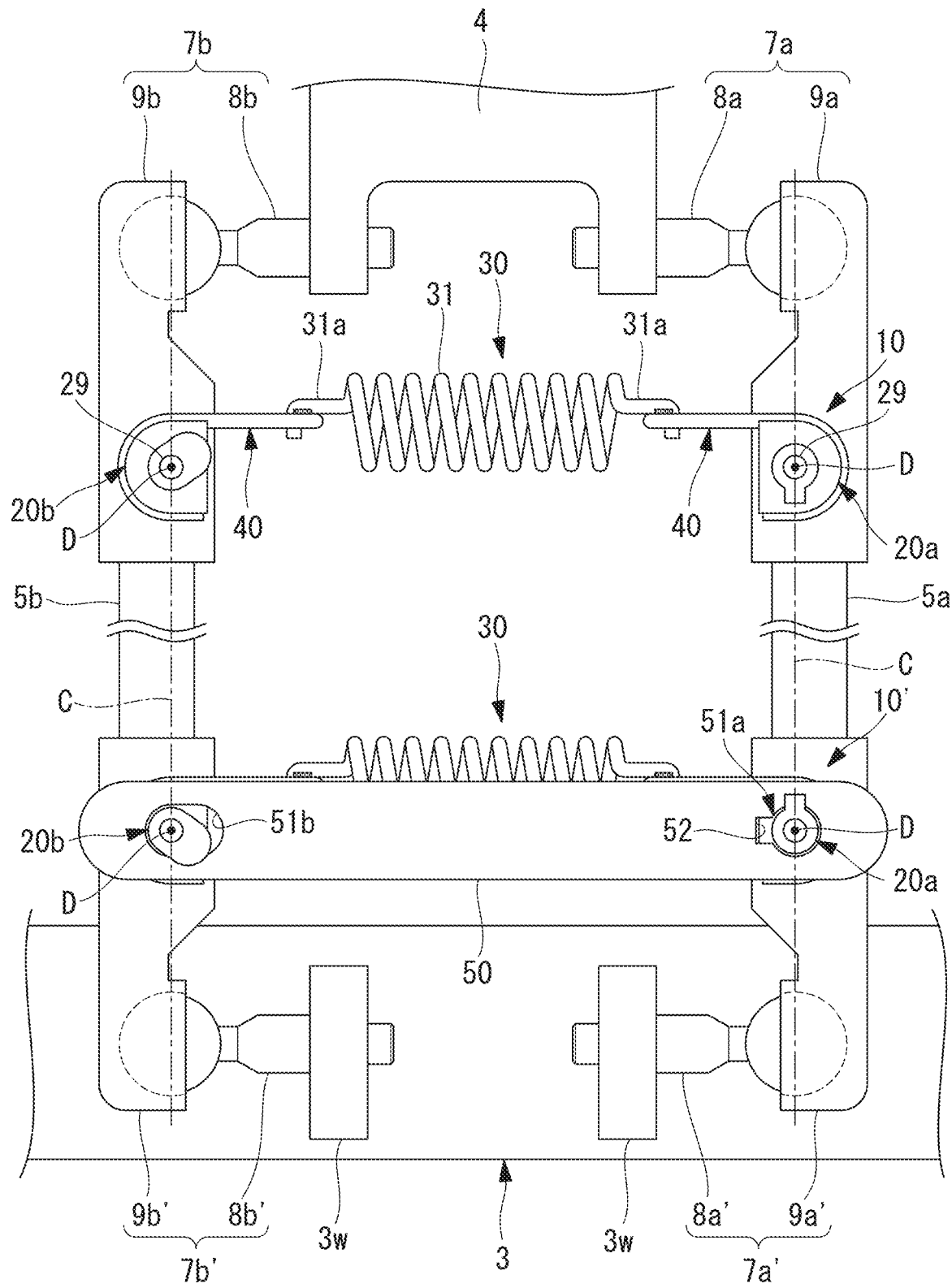
FIG. 13 is a front view schematically illustrating the shape of a biasing mechanism in a first modification of the connection structure illustrated in FIG. 2.

The two hooks 40 can be welded to the hook portions 31a on the two sides of the coil spring 31, as illustrated in FIG. 13. In this case, the assembly may be carried out in a different order from that in the above-described assembly method. For example, first, the connection member 50 is connected to the bushings 20a, 20b. Next, the hooks 40 welded on both sides can be hooked onto the bushings 20a, 20b while stretching the coil spring 31.

In other words, the rotation of the bushings 20a, 20b around the axis D is not restricted when the biasing mechanism 30 is not attached. Therefore, the connection member 50 is attached by simultaneously aligning the phases of the claws 24a, 24b with the phases of the two attachment holes 51a, 51b of the connection member 50. Then, the bushings 20a, 20b are rotated about the axis D so as to change the phases. After that, the biasing mechanism 30 is attached in order to regulate the rotation of the bushings 20a, 20b.

This allows the coil spring 31 and the two hooks 40 to be integrally handled. Assembly work can be made easier when the space in which the connection structure 10 is to be attached is small.

In this case, the phases of the claws 24a, 24b with respect to the straight grooves 25b can be freely set. Therefore, the claw 24b can also be disposed in a phase that is significantly displaced from the length direction of the attachment hole 51b to more reliably prevent the connection member 50 from falling off.

In particular, if the phases of the claws 24a, 24b with respect to the straight grooves 25b are the same, the same bushing as the bushing 20a can be used as the bushing 20b. As a result, the number of components can be reduced and manufacturing costs can be reduced by standardizing the components. In addition, during assembly work, there is no need to pay attention to the type of bushings and work efficiency can be improved.

In this case, by maintaining the shape of the attachment hole 51*b* as a long hole, changes in the distance between the links 5*a*, 5*b* due to aging etc. can be accommodated.

In this embodiment, the contact between the straight portions 41*b* of the hooks 40 and the straight grooves 25*b* of the bushings 20*a*, 20*b* regulates the relative rotation therebetween. Alternatively, the bushings 20*a*, 20*b* do not have to include the straight grooves 25*b*.

Figure 14:
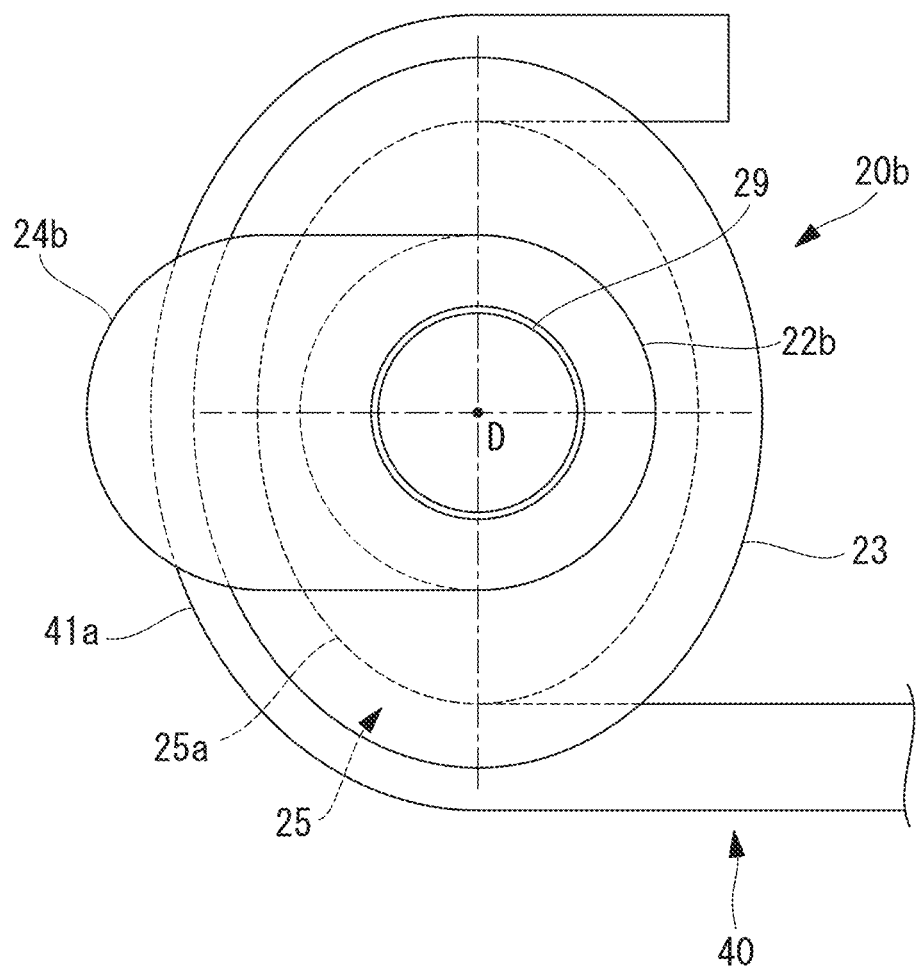
FIG. 14 is a schematic diagram illustrating the shape of one bushing in a second modification of the connection structure illustrated in FIG. 2.

For example, as illustrated in FIG. 14, the groove 25 of the bushing 20*b* has a non-circular cross-sectional shape, such as an oval shape. The curved portions 41*a* of the hooks 40 are curved into a shape that matches the grooves 25 of the bushings 20*a*, 20*b*.

As a result, when the biasing mechanism 30 is connected, the rotation of the bushing 20*b* around the axis D is regulated by the elastic restoring force of the coil spring 31. As a result, the phases around the axis D of the claw 24*b* of the bushing 20*b* and the attachment hole 51*b* of the connection member 50 can be maintained shifted from each other similarly to as described above.

Substantially the same configuration can also be used for bushing 20*a* and the hook 40 connected to bushing 20*a* to achieve the same effect.

The cross-sectional shape of the grooves 25 in the bushings 20*a*, 20*b* may be noncircular shapes other than an oval shape. Any cross-sectional shape may be adopted as long as the shape regulates rotation around the axis D by contacting the curved portions 41*a* of the hook 40.

For example, the cross-sectional shape of the grooves 25 of the bushings 20*a*, 20*b* may be a circular shape decentered with respect to the axis D. This also allows the rotation of bushings 20*a*, 20*b* around the axis D to be regulated by contacting the curved portions 41*a* of the hook 40.

According to this embodiment, one attachment pin 29 was press-fitted into each of the sockets 9*a*, 9*b*, with both ends of the attachment pin 29 protruding in the direction of the axis D. Alternatively, two attachment pins 29 may be press-fitted into the sockets 9*a*, 9*b* from both sides in the direction of the axis D.

For example, the attachment pins 29 may be simple round bars and may be press-fitted from both sides in the direction of the axis D to a depth of about half that of the pin hole 9*h*.

In this embodiment, the connection structure 10 is attached between the sockets 9*a*, 9*b*, and the connection structure 10' is attached between the sockets 9*a'*, 9*b'*. Alternatively, the connection structure 10' attached between the sockets 9*a'*, 9*b'* at the other ends of the links 5*a*, 5*b* may be omitted.

In this case, the coil spring 31 of the connection structure 10 may have a spring constant that is sufficient to hold the four ball joints 7*a*, 7*b*, 7*a'*, 7*b'*.

Although embodiments of the present disclosure have been described in detail above, the present disclosure is not limited to the individual embodiments described above. Various additions, substitutions, changes, partial omissions, and so forth may be made to the embodiments to the extent that the resulting embodiments do not depart from the gist of the present invention or from the idea and purpose of the present invention derived from the claims and equivalents thereto. For example, the order of individual operations and the order of individual processes in the above mentioned embodiments are illustrated merely as examples and are not limited to this.

The invention claimed is:

1. A connection structure interconnecting two links, the two links having longitudinal axes and being spaced apart from each other in parallel and operated, the connection structure comprising:
    bushings attached to the links so as to be rotatable about an axis perpendicular to a plane containing the two longitudinal axes;
    a biasing mechanism spanning between the bushings of the two links and applying an elastic restoring force to the two bushings in a direction in which the two bushings move closer together; and
    a connection member having two attachment holes through which the bushings can pass in a direction of the axis and regulating a distance between the bushings to be less than or equal to a prescribed distance,
    wherein the bushings include claw portions projecting radially outward at part of, in a peripheral direction, an end portion of each of the bushings in the direction of the axis,
    the attachment holes are formed in a shape allowing the bushings to pass therethrough only at a prescribed attachment phase around the axis coinciding with the claw portions of the bushings, and
    a phase of the bushings around the axis is regulated by the elastic restoring force to a phase that does not match the attachment phase.

2. The connection structure according to claim 1, wherein the bushings are disposed on both sides of the links in the direction of the axis,
    the biasing mechanism is connected to the bushings on both sides of the links.

3. The connection structure according to claim 1, wherein the biasing mechanism includes an elastic body that generates the elastic restoring force and hooks disposed at both ends of the elastic body and configured to hook onto the bushings.

4. The connection structure according to claim 3, wherein the hooks and bushings have shapes that are maintained in a state where relative rotation around the axis is prohibited when the hooks are hooked.

5. The connection structure according to claim 4, wherein at least one end of the elastic body and the hooks are connected so as to be rotatable relative to each other around an axis parallel to the axis.

6. The connection structure according to claim 5, wherein a groove that is recessed radially inward and is configured to catch the hooks is provided at a midway position, in the direction of the axis, of a circumferential surface of each of the bushings.

7. A parallel link robot comprising:
    a base;
    a movable part disposed away from the base;
    a plurality of arms pivotably connected to the base;
    pairs of links having longitudinal axes parallel to each other that connect the arms to the movable part; and
    the connection structure according to claim 1 provided between each of the pairs of links.

* * * * *